United States Patent [19]
Röber et al.

[11] Patent Number: 5,472,784
[45] Date of Patent: Dec. 5, 1995

[54] THERMOPLASTIC MULTILAYER COMPOSITES

[75] Inventors: Stefan Röber; Roland Feinauer; Hans Jadamus, all of Marl, Germany

[73] Assignee: Huels Aktiengesellschaft, Marl, Germany

[21] Appl. No.: 187,503

[22] Filed: Jan. 28, 1994

[30] Foreign Application Priority Data

Oct. 25, 1993 [DE] Germany ............... 43 36 291.5

[51] Int. Cl.⁶ ............... B32B 27/00; B32B 27/08; B32B 27/30; B32B 27/34
[52] U.S. Cl. ............... 428/421; 428/474.4; 428/474.9; 428/475.8; 428/476.3; 525/183
[58] Field of Search ............... 428/422, 421, 428/473.5, 474.4, 475.5, 475.8, 520, 423.5, 424.6, 475.8, 476.3, 474.7, 474.9; 525/329.5, 183, 181

[56] References Cited

U.S. PATENT DOCUMENTS

| | | | |
|---|---|---|---|
| 4,246,374 | 1/1981 | Kopchick | 525/329 |
| 4,415,706 | 11/1983 | Staas | 525/183 |
| 4,563,393 | 1/1986 | Kitagawa et al. | 428/412 |
| 4,727,117 | 2/1988 | Hallden-Abberton et al. | 525/343 |
| 4,749,607 | 6/1988 | Ochiumi | 428/215 |
| 4,874,817 | 10/1989 | Inskip et al. | 525/183 |
| 5,139,878 | 8/1992 | Kim et al. | 428/421 |
| 5,258,213 | 11/1993 | Mügge et al. | 428/36.91 |

FOREIGN PATENT DOCUMENTS

| | | |
|---|---|---|
| 0094215 | 11/1983 | European Pat. Off. |
| 0404346 | 12/1990 | European Pat. Off. |
| 0456267 | 11/1991 | European Pat. Off. |
| 0464561 | 1/1992 | European Pat. Off. |
| 0523644 | 1/1993 | European Pat. Off. |
| 0551094 | 7/1993 | European Pat. Off. |
| 0558373 | 9/1993 | European Pat. Off. |
| 0559445 | 9/1993 | European Pat. Off. |
| WO93/02138 | 2/1993 | WIPO |

OTHER PUBLICATIONS

Research Disclosure, No. 320, Dec. 1990, pp. 956–957, W. N. Dintinger, et al., "Enhancement of Properties of Polyglutarimides when Compounded with Small Amounts of Polyamides".

Research Disclosure, No. 321, Jan. 1991, pp. 68A–68B, P. Maxson, et al., "Control of Functionality in Glutarimide Polymers".

Database WPI, Derwent Publications, AN 92-320278, JP-A-04 224 939, Aug. 14, 1992.

*Primary Examiner*—Paul J. Thibodeau
*Assistant Examiner*—Vivian Chen
*Attorney, Agent, or Firm*—Oblon, Spivak, McClelland, Maier, & Neustadt

[57] ABSTRACT

The present invention relates to a composite material having improved thermal and mechanical properties which comprises at least:

(I) an outer layer made of a molding composition based on polyvinylidene fluoride, and (II) an intermediate layer which neighbors the inner layer and is made of a molding composition based on a mixture of (a) from 40–90% by weight a polyamide and (b) from 60–10% by weight a polyglutarimide, wherein the two layers (I) and (II) are adhesively bonded to one another.

16 Claims, No Drawings

THERMOPLASTIC MULTILAYER COMPOSITES

FIELD OF THE INVENTION

The invention relates to thermoplastic multilayer composites comprising at least two layers, one containing a polyamide and the other containing a polyvinylidene fluoride. These composites are temperature- and solvent-resistant.

Discussion of the Background

There are a number of applications for which polyamides and polyvinylidene fluoride are unsuitable. Polyamides are, for example, not resistant to weathering, since they age on exposure to light and absorb atmospheric moisture. This leads to discoloration, deterioration of mechanical properties and distortion phenomena. Although polyamides basically have good mechanical properties, in particular good toughness, they have a poor barrier action; thus polar materials can easily migrate through polyamides. This is especially disadvantageous when polyamides are used in, for example, motor fuel lines in which alcohol-containing fuel is conveyed.

On the other hand, polyvinylidene fluoride generally has good weathering resistance, possesses a good chemical resistance and can easily be painted. In addition, polyvinylidene fluoride possesses an excellent barrier action with respect to both polar and nonpolar media. A disadvantage is its impact sensitivity; in particular, the notched impact toughness is insufficient.

It is known that the majority of polymers, including polyamide and polyvinylidene fluoride, are incompatible with one another, because insufficient adhesion between the laminate layers is achieved during production of multilayer composites. An adhesive bond is, however, absolutely essential in industrial applications.

French Patent 2 602 515 describes a two-layer pipe having an outer layer of polyamide 11 and an inner layer of plasticized polyvinylidene fluoride. However, no adhesive bonding exists between the layers.

French Patent 2 577 564 describes composite materials made of, inter alia, polyamides and mixtures of polyvinylidene fluoride and carbonyl-containing polymers, which can also be produced by coextrusion.

Composite materials based on polyamide and polyvinylidene fluoride with adhesive bonding between the layers are not known.

SUMMARY OF THE INVENTION

Accordingly, one object of the present invention is to provide a solvent-resistant and temperature-resistant bond between polyamide and polyvinylidene fluoride, which is insensitive to shear stresses and possesses good mechanical properties. In particular, very good adhesion between layers should be achieved.

The present inventors have now found that this object is achieved by a thermoplastic multilayer composite which comprises at least:

(I) a layer made of a moulding composition based on polyvinylidene fluoride, and (II) a second layer which neighbours the layer according to I. and is made of a moulding composition based on a mixture of (a) a polyamide and (b) a polyglutarimide, wherein the two layers (I) and (II) are adhesively bonded to one another.

DETAILED DESCRIPTION OF THE PREFERRED EMBODIMENTS

Layer (I) suitably comprises, in particular, polyvinylidene fluoride which is preferably plasticizer-free. Polyvinylidene fluoride can be prepared using conventional methods (Hans R. Kricheldorf, Handbook of Polymer Synthesis, Part A, Verlag Marcel Dekker Inc. New York—Basel—Hong Kong, page 191 ff.; Kunststoff Handbuch, 1st edition, Volume XI, Carl Hanser Verlag Munich (1971), page 403 ff.).

Copolymers of polyvinylidene fluoride which contain up to 40% by weight of other monomers may also be used in accordance with the present invention. Examples of suitable monomers include trifluoroethylene, ethylene, propene and hexafluoropropene.

The polyvinylidene fluoride used according to the invention suitably has a melt flow index of <17 g/10 min, preferably from 2 to 13 g/10 min. (DIN 53 735).

Preferably, layer (I) is electrically conductive and has a surface resistance $<10^9$ $\Omega$. Good electrical conductivity can be achieved by adding up to 15% by weight of, for example, conductive carbon black, carbon fibers or the like.

Suitably, component (IIa) is an aliphatic homo- or copolyamide. Suitable homopolyamides include polyamides 4.6, 6.6, 6.12, 8.10, 10.10 or the like. Preferably, polyamides 6, 10.12, 11, 12.12 and, in particular, 12 are used. The designation of the polyamides corresponds to the international standard, where the first number(s) indicates the number of carbon atoms in the starting diamine and the last number(s) indicates the number of carbon atoms in the dicarboxylic acid. If only one number is given, this indicates that the starting material was $\alpha,\omega$-aminocarboxylic acid or the lactam derived therefrom (H. Domininghaus, Die Kunststoffe und ihre Eigenschaften, page 272, VDI—Verlag (1976)).

Suitable copolyamides which can be used as component (IIa) can contain, for example, adipic acid, sebacic acid, suberic acid, isophthalic acid, terephthalic acid as co-acid or bis(4-aminocyclohexyl)methane, trimethylhexamethylenediamine, hexamethylenediamine or the like as co-diamine. These polyamides and copolyamides can be prepared according to conventional methods (for example D. B. Jacobs, J. Zimmermann, Polymerization Processes, pp. 424–67; Interscience Publishers, New York (1977); DE-B 21 52 194).

Other suitable polyamides include mixed aliphatic/aromatic polycondensates, as described, for example, in U.S. Pat. Nos. 2,071,250; 2,071,251; 2,130,523; 2,130,948; 2,241,322; 2,312,966; 2,512,606; 3,393,210 or in Kirk-Othmer, Encyclopedia of Chemical Technology, 3rd edition, Volume 18, Wiley & Sons (1982), pp. 328 and 435. Other polycondensates suitable as polyamides are poly(ether ester amides) and poly(ether amides). Such products are described in, for example, DE-A 27 12 987, DE-A 25 23 991 and DE-A 30 06 961.

The number average molecular weight of the polyamides is suitably greater than 5,000 g/mol, preferably greater than 10,000 g/mol. These molecular weights correspond to a relative viscosity ($\eta_{rel}$) in the range of from 1.65 to 2.4.

Preferably, polyamides which contain $\leq 50\%$ of amino terminal groups, in particular $<20\%$ of amino terminal groups are used.

The polyamides of component (IIa) may contain up to 40% by weight of other thermoplastics, provided that these do not adversely affect the properties according to the invention. Suitable thermoplastics include polycarbonate (H. Schnell, Chemistry and Physics of Polycarbonates, Interscience Publishers, New York (1981)), acrylonitrile/styrene/butadiene copolymers (Houben-Weyl, Methoden der organischen Chemie, Volume 14/1, Georg Thieme Verlag Stuttgart, pp. 393–406; Ullmanns Encyclopädie der technischen Chemie, 4th edition, Volume 19, Verlag Chemie Weinheim (1981), pp. 279–284), acrylonitrile/styrene/acrylate copolymers (Ullmanns Encyclopädie der technischen Chemie, 4th edition, Volume 19, Verlag Chemie Weinheim (1981), pp. 277–295), acrylonitrile/styrene copolymers (Ullmanns Encyclopädie der technischen Chemie, 4th edition, Volume 19, Verlag Chemie Weinheim (1981), page 273 ff.) or polyphenylene ethers (DE-A 32 24 691 and DE-A 32 24 692 and U.S. Pat. Nos. 3,306,874; 3,306,875 and 4,028,341).

If required, the polyamides may be impact-modified. Suitable modifiers are, for example, ethylene/propylene or ethylene/propylene/diene copolymers (EP-A 295 076), polypentenylene, polyoctenylene or random or blocked copolymers made of alkenyl-aromatic compounds with aliphatic olefines or dienes (EP-A 261 748). Also suitable are impact-modifying rubbers such as core/shell rubbers having a tough, resilient core of (meth)acrylate, butadiene or styrene/butadiene rubber having glass transition temperatures $T_g$ <−10° C., where the core may be crosslinked. The shell can be built up of styrene and/or methyl methacrylate and/or further unsaturated monomers (DE-A 21 44 528 and DE-A 37 28 685). The proportion of impact-modifier should be selected so that the desired properties are not impaired.

In addition to polyamide as component (IIa), layer (II) also contains a component (IIb). As component (IIb), polyglutarimides are employed which contain the following basic building blocks, i) <a maximum of 98.8% % by weight, preferably from 10 to 60% by weight, of

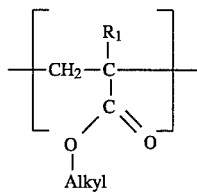

ii) <greater than 0% by weight to a maximum of 98.8% by weight, preferably from 30 to 80% by weight, of

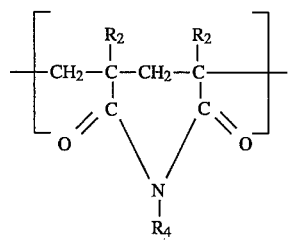

iii) <20% by weight, preferably from 2 to 10% by weight, of

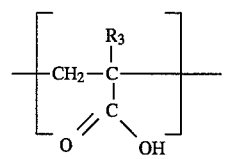

iv) from 1.2 to 20% by weight, preferably from 1.5 to 12% by weight, particularly preferably from 2 to 10% by weight, of

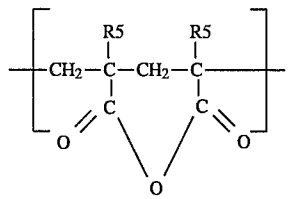

wherein Alkyl is methyl, ethyl, propyl, butyl, or hexyl; and $R_1$ to $R_5$, idential or different, are hydrogen or $(C_nH_{2n+1})$ where n is an integer of from 1 to 6. Preferably, those basic building blocks in which alkyl and $R_1$ to $R_5$ are each methyl radicals are used.

The polymers of component (IIb) are designated as polyglutarimides because they are poly(alkyl)acrylic esters in which two neighbouring carboxylate groups have been converted into a cyclic imide. The imide is preferably formed with ammonia or primary amines, such as methylamine. Polyglutarimides can be prepared according to conventional methods (Hans R. Kricheldorf, Handbook of Polymer Synthesis, Part A, Verlag Marcel Dekker Inc. New York Basel—Hong Kong, page 223 ff.; H. G. Elias, Makromoleküle, Hüthig and Wepf Verlag Basel—Heidelberg—New York; U.S. Pat. Nos. 2,146,209 and 4,246,374).

The polyglutarimides used according to the invention suitably have a melt flow index of <30 g/10 min, preferably from 0.3 to 15 g/10 min.

To increase the low-temperature impact toughness, the polyglutarimides can additionally contain appropriate modifiers. Suitable modifiers include core/shell polymers having a polybutyl acrylate core and a shell of polymethyl methacrylate and/or polyglutarimide. In addition to these examples, any other conventional modifiers can be used.

The preparation of the moulding composition for the layer (II) is carried out by conventional and known processes by mixing melts of the components (IIa) and (IIb) in a mixer which provides good kneading, such as a twin-screw extruder, at temperatures which depend on the melting points of components (IIa) and (IIb), in general at temperatures between 230° and 330° C.

The preparation of the moulding composition for the layer (II) can also be carried out directly in a feed extruder which is used for the production of the thermoplastic multilayer composite in the coextrusion facility or injection moulding facility which is used, so that the moulding composition for the layer according to (II) can be processed directly after its preparation, without further intermediate storage, to give a layer of the thermoplastic multilayer composite.

The components (IIa) and (IIb) are used in a weight ratio of from 40 to 90: of from 60 to 10, preferably of from 60 to 80: of from 40 to 20.

In addition to the layers (I) and (II) according to the invention, the thermoplastic multilayer composites can have a further layer (III). This layer is adjacent to the layer (II), on the opposite side to the layer (I). The layer (III) is likewise adhesively bonded to the layer (II).

The moulding compositions for the layers (I) to (III) may additionally contain conventional auxiliaries and additives such as, for example, flameproofing agents, stabilizers, plasticizers, processing aids, viscosity improvers, fillers, in particular those for improving the conductivity, pigments or the like. The amount of said agents should be metered in so that the desired properties are not seriously affected.

The production of the thermoplastic multilayer composites can take place in one or more stages.

In a single-stage extrusion process the various melts are coextruded in a conventional manner. In the single-stage injection-moulding process the various melts are combined in a mould and the moulding is allowed to cool (multicomponent injection moulding).

In a multistage process, a moulding is first produced from one of the components (I), (II) or optionally (III) and is then bonded to the remaining components by pressing, injection moulding or extrusion.

The thermoplastic multilayer composites of the invention have outstanding resistance to, and barrier action against diffusion of, chemical agents, solvents and fuels. Furthermore, the layers are adhesively bonded to one another, so that delamination of the various layers from one another does not occur, for example on thermal expansion or flexing of the finished part. In addition, it is also possible to produce parts which comprise a number of the multilayer composites of the invention on top of one another (alternatingly).

The multilayer composites of the invention are used in structural parts, in particular in the sector of the electrical, engineering and automobile industries, where the barrier action of the polyvinylidene fluoride needs to be combined with the good mechanical properties of the polyamide, particularly its good low-temperature impact toughness, or the disadvantageous properties of the polyamide such as poor UV resistance, insufficient scratch resistance or poor chemical resistance need to be counteracted by a coating of polyvinylidene fluoride.

Having generally described this invention, a further understanding can be obtained by reference to certain specific examples which are provided herein for purposes of illustration only and are not intended to be limiting unless otherwise specified.

EXAMPLES

The stated parameters were determined by means of the following measurement methods.

The determination of the melt flow index of the polyglutarimides is carried out at 230° C. and under a load of 3.8 kg (DIN 53 735).

The determination of the melt flow index of the polyvinylidene fluorides is carried out at 230° C. and under a load of 5 kg (DIN 53 735).

The determination of the solution viscosity (relative viscosity $\eta_{rel}$) of the polyamides is carried out using a 0.5% strength by weight m-cresol solution at 25° C. in accordance with DIN 53 727/ISO 307.

For the determination of the amino terminal groups, 1 g of the polyamides is dissolved in 50 ml of m-cresol at 25° C. The solution is titrated potentiometrically with perchloric acid.

For the determination of the carboxyl terminal groups in the polyamides, 1 g of polycondensate is dissolved in 50 ml of benzyl alcohol under a blanket of nitrogen at 165° C. The dissolution time is a maximum of 20 minutes. The solution is titrated with a solution of KOH in ethylene glycol (0.05 mol of KOH/1) against phenolphthalein until the colour changes.

The testing of the ease of mechanical separation at the interface is carried out using a metal wedge (edge angle: 5°; loading weight: 2.5 kg); this test attempts to separate the material interface layer to be tested. If separation takes place at the interface between the components, the adhesion is poor. If, by contrast, the separation takes place wholly or partly within one of the two components, good adhesion is present.

Examples denoted by letters are not according to the invention.

A. Component I

PVDF 1: Polyvinylidene fluoride (melt flow index: 13 g/10 min, DYFLOR® LE—HÜLS AG)

PVDF 2: Polyvinylidene fluoride (melt flow index: 8.5 g/10 min, DYFLOR® EE—HÜLS AG)

PVDF 3: Polyvinylidene fluoride (melt flow index: 8.5 g/10 min, 6 parts by weight of commercial conductive carbon black (KETJEN BLACK™ EC 300—AKZO) per 100 parts by weight of PVDF; DYFLOR® EE—HÜLS AG)

B. Component II

The polyglutarimides comprise the basic building blocks specified in claim 7 as i) to iv), where alkyl and $R_1$ to $R_5$ are methyl groups.

The mixtures for the component (II) are prepared in a twin-screw extruder at a compound temperature of 280° C.

Composition of the polyglutarimides used in the examples:

|  | Polyglutarimide | | Melt Flow Index [g/10 min] Polyglutarimide | |
|---|---|---|---|---|
| Amount | A | B | A | B |
| i) % by weight | 18 | 57 | | |
| ii) % by weight | 77 | 30 | | |
| iii) % by weight | 3 | 3 | 0.4 | 0.4 |
| iv) % by weight | 2 | 10 | | |

Z 1: Mixture of
a. 50 parts by weight of polyamide 12 ($\eta_{rel}$: 2.1; plasticizer content: 0; amino terminal groups: 9 mmol/kg; carboxyl terminal groups: 48 mmol/kg; VESTAMID® L 2140, HÜLS AG) and
b. 50 parts by weight of polyglutarimide A Z 2: Mixture of
a. 70 parts by weight of polyamide 12 ($\eta_{rel}$: 2.1; plasticizer content: 0; amino terminal groups: 9 mmol/kg; carboxyl terminal groups: 48 mmol/kg; VESTAMID® L 2140, HÜLS AG) and
b. 30 parts by weight of polyglutarimide A Z 3: Mixture of
a. 70 parts by weight of polyamide 12 ($\eta_{rel}$: 1.8; plasticizer content: 0; amino terminal groups: 5 mmol/kg; carboxyl terminal groups: 73 mmol/kg; VESTAMID® L 1801, HÜLS AG) and
b. 30 parts by weight of polyglutarimide B Z 4: Mixture of
 a. 60 parts by weight of polyamide 12 ($\eta_{rel}$: 2.1; plasticizer content per 100 parts by weight of polyamide: 15 parts by weight of N-n-butyl-benzenesulphonamide; amino terminal groups: 9 mmol/kg; carboxyl terminal groups: 48 mmol/kg; VESTAMID® L 2124, HÜLS AG) and
 b. 40 parts by weight of polyglutarimide A Z 5: Mixture of
 a. 80 parts by weight of polyamide 12 ($\eta_{rel}$: 2.1; plasticizer content per 100 parts by weight of polyamide: 15 parts by weight of N-n-butyl-benzenesulphonamide; amino terminal groups: 9 mmol/kg; carboxyl terminal groups: 48 mmol/kg; VESTAMID® L 2124, HÜLS AG) and
 b. 20 parts by weight of polyglutarimide B

C. Component III

PA 1: Polyamide 12 ($\eta_{rel}$: 2.1; plasticizer content: 0; amino terminal group content: 9 mmol/kg; carboxyl terminal group content: 48 mmol/kg; VESTAMID® L 2140, HÜLS AG)

PA 2: Polyamide 12 ($\eta_{rel}$: 2.1; plasticizer content per 100 parts by weight of polyamide: 15 parts by weight of N-n-butylbenzenesulphonamide; amino terminal group content: 9 mmol/kg; carboxyl terminal group content: 48 mmol/kg; VESTAMID® L 2124, HÜLS AG)

D. Production of the thermoplastic multilayer composites

Both two-layer films and also two- and three-layer pressed sheets are produced.

The production of the two-layer films was carried out on a laboratory coextrusion facility, the two feed extruders of which have screw diameters of 25 mm and 30 mm, respectively. The barrel temperatures were 230° C. (PA 1, PA 2), 250° C. (PVDF 1, PVDF 2, PVDF 3), 260° C. (Z 2, Z 3, Z 4, Z 5) and 280° C. (Z 1). The layer thickness was in each case 0.5 mm in the individual layer, i.e. the composite film had a total thickness of 1 mm.

The production of the pressed sheets was carried out in a laboratory press at 270° C. using a pressing time of 5 minutes. The layer thickness was in each case 1 mm, i.e. the two-layer pressed sheet had a total thickness of 2 mm, the three-layer pressed sheet correspondingly had a thickness of 3 mm.

TABLE A

Two-layer films and pressed sheets

| Experiment No. | Component | | | Mechanically separable at the interface | | | |
|---|---|---|---|---|---|---|---|
| | | | | Two-layer film after storage | | Pressed sheet after storage | |
| | I | II | III | at 23° C. | in M 15* | at 150° C. | at 23° C. | in M 15* |
| A | PVDF 1 | — | PA 1 | yes | yes | yes | yes | yes |
| B | PVDF 1 | — | PA 2 | yes | yes | yes | yes | yes |
| C | PVDF 1 | — | PA 1 | yes | yes | yes | yes | yes |

TABLE A-continued

Two-layer films and pressed sheets

| Experiment No. | Component | | | Mechanically separable at the interface | | | | |
|---|---|---|---|---|---|---|---|---|
| | | | | Two-layer film after storage | | | Pressed sheet after storage | |
| | I | II | III | at 23° C. | in M 15* | at 150° C. | at 23° C. | in M 15* |
| 1 | PVDF 2 | Z 1 | — | no | no | no | no | no |
| 2 | PVDF 1 | Z 2 | — | no | no | no | no | no |
| 3 | PVDF 1 | Z 3 | — | no | no | no | no | no |
| 4 | PVDF 2 | Z 4 | — | no | no | no | no | no |
| 5 | PVDF 1 | Z 5 | — | no | no | no | no | no |
| | 3 | | | | | | | |

TABLE B

Pressed sheet made of 3 layers:

| Experiment No. | Order of layers | | | Mechanically separable at the interface after storage in M 15* | |
|---|---|---|---|---|---|
| | I | II | III | Layer I and II | Layer II and III |
| 6 | PVDF 1 | Z 3 | PA 2 | no | no |

*Storage at 23° C. for 5 days in standard fuel M 15 (42.5% by volume of isooctane, 42.5% by volume of toluene and 15% by volume of methanol)

What is claimed as new and desired to be secured by Letters Patent of the United States is:

1. A thermoplastic multilayer composite which comprises at least:
 (I) a layer formed from a polyvinylidene fluoride molding composition, and
 (II) a second layer adjacent to said layer (I) formed from a molding composition consisting essentially of a mixture of
  (a) from 40–90% by weight polyamide, and
  (b) from 60–10% by weight polyglutarimide, wherein the two layers (I) and (II) adhesively bond to each other, said polyglutarimide component (IIb) consisting of the following building blocks:
   i) a maximum of 98.8% by weight, based on the total weight of component (IIb) of

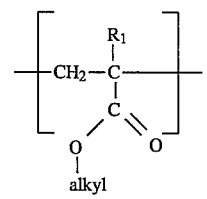

ii) greater than 0% by weight to a maximum of 98.8% by weight, based on the total weight of component (IIb), of

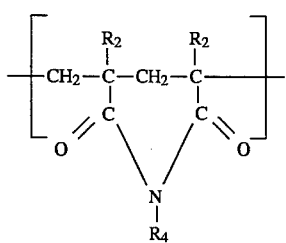

iii) <20% by weight, based on the total weight of component (IIb), of

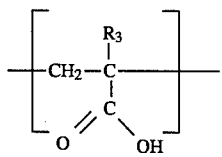

iv) from 1.2 to 20% by weight, based on the total weight of component (IIb), of

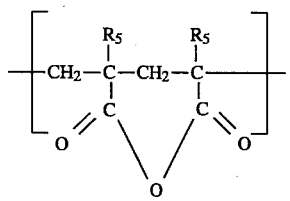

wherein alkyl is methyl, ethyl, propyl, butyl, or hexyl; and $R_1$ to $R_5$, identical or different, are hydrogen or $(C_nH_{2n+1})$ where n is an integer of from 1 to 6.

2. The thermoplastic multilayer composite of claim 1, wherein said component (IIb) consists of the following basic building blocks:

i) from 10 to 60% by weight, based on the total weight of component (IIb) of

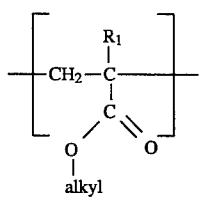

ii) from 30 to 80% by weight, based on the total weight of component (IIb), of

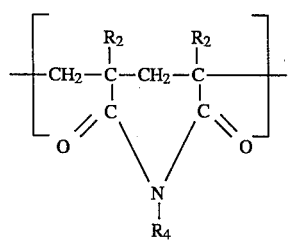

iii) from 2 to 10% by weight, based on the total weight of component (IIb), of

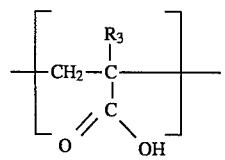

iv) from 1.5 to 12% by weight, based on the total weight of component (IIb), of

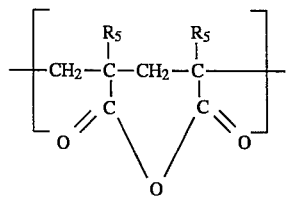

wherein alkyl is methyl, ethyl, propyl, butyl, or hexyl; and $R_1$ to $R_5$, identical or different, are hydrogen or $(C_nH_{2n+1})$ where n is an integer of from 1 to 6.

3. The thermoplastic multilayer composite of claim 1, wherein said layer (I) comprising a polyvinylidene fluoride molding composition has a melt flow index of <17 g/10 min.

4. The thermoplastic multilayer composite of claim 3, wherein said melt flow index of said polyvinylidene fluoride molding composition ranges from 2 to 13 g/10 min.

5. The thermoplastic multilayer composite of claim 1, wherein the polyvinylidene fluoride of the molding composition which forms layer (I) is a polyvinylidene fluoride copolymer.

6. The thermoplastic multilayer composite of claim 5, wherein a comonomer polymerized with vinylidene fluoride for the preparation of said polyvinylidene fluoride copolymer is trifluoroethylene, ethylene, propene or hexafluoropropene.

7. The thermoplastic multilayer composite of claim 1, wherein the relative amounts of said components (IIa) and (IIb) are 60 to 80% by weight and 20 to 40% by weight respectively.

8. The thermoplastic multilayer composite of claim 1 wherein the amount of building block (iv) ranges from 2 to 10% by weight of the components of polyglutarimide (IIb).

9. The thermoplastic multilayer composite of claim 1, wherein said alkyl group and groups $R_1$ to $R_5$ are each methyl.

10. The thermoplastic multilayer composite of claim 1, which further comprises a polyamide 12 layer (III) directly adjacent to layer (II), on the side opposite layer (I), wherein said layers (II) and (III) are adhesively bonded to each other.

11. The thermoplastic multilayer composite of claim 10, wherein said layer (III) is formed of a polyamide 12/polyglutarimide blended composition.

12. The thermoplastic multilayer composite of claim 1, wherein said layer (I) is electrically conductive and has a surface resistance of $<10^9 \Omega$.

13. The thermoplastic multilayer composite of claim 1, wherein the polyamide component (IIa) contains an impact modifier selected from the group consisting of ethylene/propylene copolymer, ethylene/propylene/diene copolymer, polypentenylene, polyoctenylene, random or block copolymers formed of alkenylaromatic compounds with aliphatic olefins or dienes, and a core/shell rubber having a core of (meth)acrylate, butadiene or styrene/butadiene rubber.

14. A molding comprising a thermoplastic multilayer composite which comprises at least:
(I) a layer formed from a polyvinylidene fluoride molding composition, and
(II) a second layer adjacent to said layer (I) formed from a molding composition consisting essentially of a mixture of
(a) from 40–90% by weight polyamide, and
(b) from 60–10% by weight polyglutarimide, wherein the two layers (I) and (II) adhesively bond to each other, said polyglutarimide component (IIb) consisting of the following building blocks:
i) a maximum of 98.8% by weight, based on the total weight of component (IIb), of

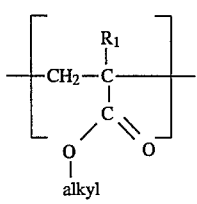

ii) greater than 0% by weight to a maximum of 98.8% by weight, based on the total weight of component (IIb), of

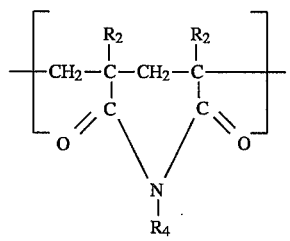

iii) <20% by weight, based on the total weight of component (IIb), of

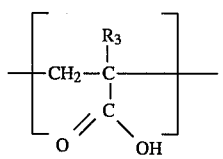

iv) from 1.2 to 20% by weight, based on the total weight of component (IIb), of

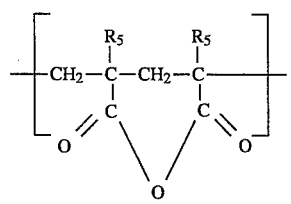

wherein alkyl is methyl, ethyl, propyl, butyl, or hexyl; and $R_1$ to $R_5$, identical or different, are hydrogen or $(C_nH_{2n+1})$ where n is an integer of from 1 to 6.

15. The molding of claim 14, wherein said component (IIb) consists of the following basic building blocks:
i) from 10 to 60% by weight, based on the total weight of component (IIb) of

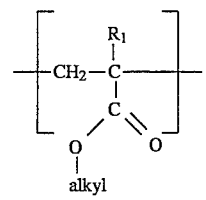

ii) from 30 to 80% by weight, based on the total weight of component (IIb), of

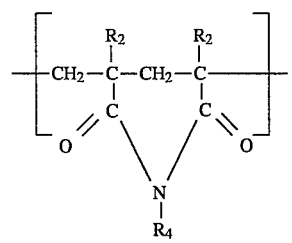

iii) from 2 to 10% by weight, based on the total weight of component (IIb), of

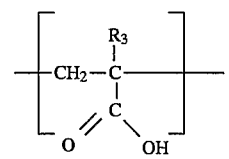

iv) from 1.5 to 12% by weight, based on the total weight of component (IIb), of

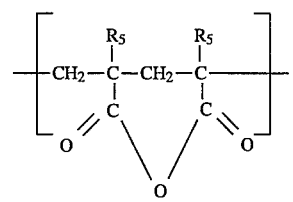

wherein alkyl is methyl, ethyl, propyl, butyl, or hexyl; and $R_1$ to $R_5$, identical or different, are hydrogen or $(C_nH_{2n+1})$ where n is an integer of from 1 to 6.

16. A hollow article comprising a thermoplastic multilayer composite which comprises at least:
(I) a layer formed from a polyvinylidene fluoride molding composition, and
(II) a second layer adjacent to said layer (I) formed from a molding composition consisting essentially of a mixture of
(a) from 40–90% by weight polyamide, and
(b) from 60–10% by weight polyglutarimide, wherein the two layers (I) and (II) adhesively bond to each other, said polyglutarimide component (IIb) consisting of the following building blocks:
i) a maximum of 98.8% by weight, based on the total weight of component (IIb) of

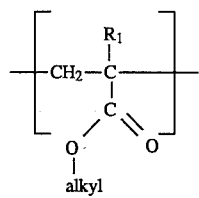
ii) a maximum of 98.8% by weight, based on the total weight of component (IIb), of
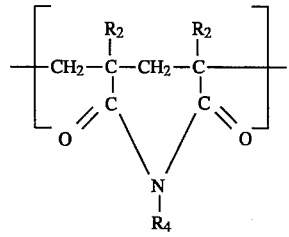
iii) <20% by weight, based on the total weight of component (IIb), of
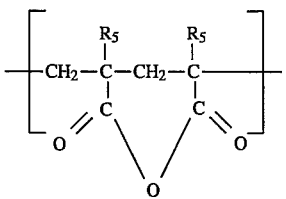
iv) from 1.2 to 20% by weight, based on the total weight of component (IIb), of
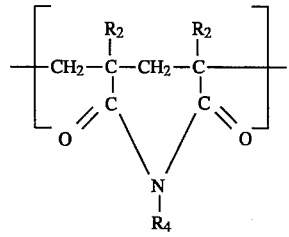
wherein alkyl is methyl, ethyl, propyl, butyl, or hexyl; and $R_1$ to $R_5$, identical or different, are hydrogen or $(C_nH_{2n+1})$ where n is an integer of from 1 to 6.
* * * * *